United States Patent [19]

Dieckmann

[11] Patent Number: 5,561,415
[45] Date of Patent: Oct. 1, 1996

[54] METHOD AND DEVICE FOR DETERMINING FILLING PRESSURE LOSS OF A PNEUMATIC VEHICLE TIRE

[75] Inventor: Thomas Dieckmann, Wennigsen, Germany

[73] Assignee: Continental Aktiengesellschaft, Hanover, Germany

[21] Appl. No.: 372,763

[22] Filed: Jan. 13, 1995

[30] Foreign Application Priority Data

Jan. 14, 1994 [DE] Germany ............................ 44 00 913.5

[51] Int. Cl.$^6$ ...................................................... B60C 23/02
[52] U.S. Cl. .......................... 340/444; 340/438; 340/442; 340/671; 73/146.2; 364/424.03; 364/426.02
[58] Field of Search .................................... 340/442, 443, 340/444, 445, 671, 438, 439; 73/146.2, 146, 146.5; 364/426.01, 426.02, 426.03, 424.03

[56] References Cited

U.S. PATENT DOCUMENTS

| | | | |
|---|---|---|---|
| 4,567,460 | 1/1986 | Gabler | 340/442 |
| 5,218,862 | 6/1993 | Hurrell, II et al. | 340/444 |
| 5,327,346 | 7/1994 | Goodell | 340/442 |
| 5,345,217 | 9/1994 | Prottey | 340/444 |
| 5,442,331 | 8/1995 | Kishimoto et al. | 340/444 |

FOREIGN PATENT DOCUMENTS 0441599 8/1991 European Pat. Off. .
0441600 8/1991 European Pat. Off. .

*Primary Examiner*—John K. Peng
*Assistant Examiner*—Daniel J. Wu
*Attorney, Agent, or Firm*—Robert W. Becker & Associates

[57] ABSTRACT

In a method for determining pressure loss in a pneumatic vehicle tire on a driven axle of a vehicle the rotational velocities of the wheels are measured and slip values for the driven wheels are calculated therefrom. Simultaneously, wheel drive forces of the vehicle for the calculated slip values are determined. The wheel drive forces and the corresponding calculated slip values are correlated and a characteristic curve is produced. The characteristic curve is compared to a predetermined characteristic curve range and a warning signal is generated when the characteristic curve is outside the predetermined characteristic range. The device for performing the method has sensors for measuring the rotational velocities of the wheels. A device for determining slip of the driven wheels from the measured rotational velocity is provided. A device for determining the wheel driven forces is present. Furthermore, a device for determining the actual characteristic curve by approximation by correlating the wheel drive forces and the slip is provided. A device for inputting and memorizing a maximum slope limit of a predetermined characteristic curve range is provided. Another device compares the slope of the actual characteristic curve to the maximum slope limit and emits a warning signal when the slope of the actual characteristic curve surpasses the maximum slope limit.

11 Claims, 1 Drawing Sheet

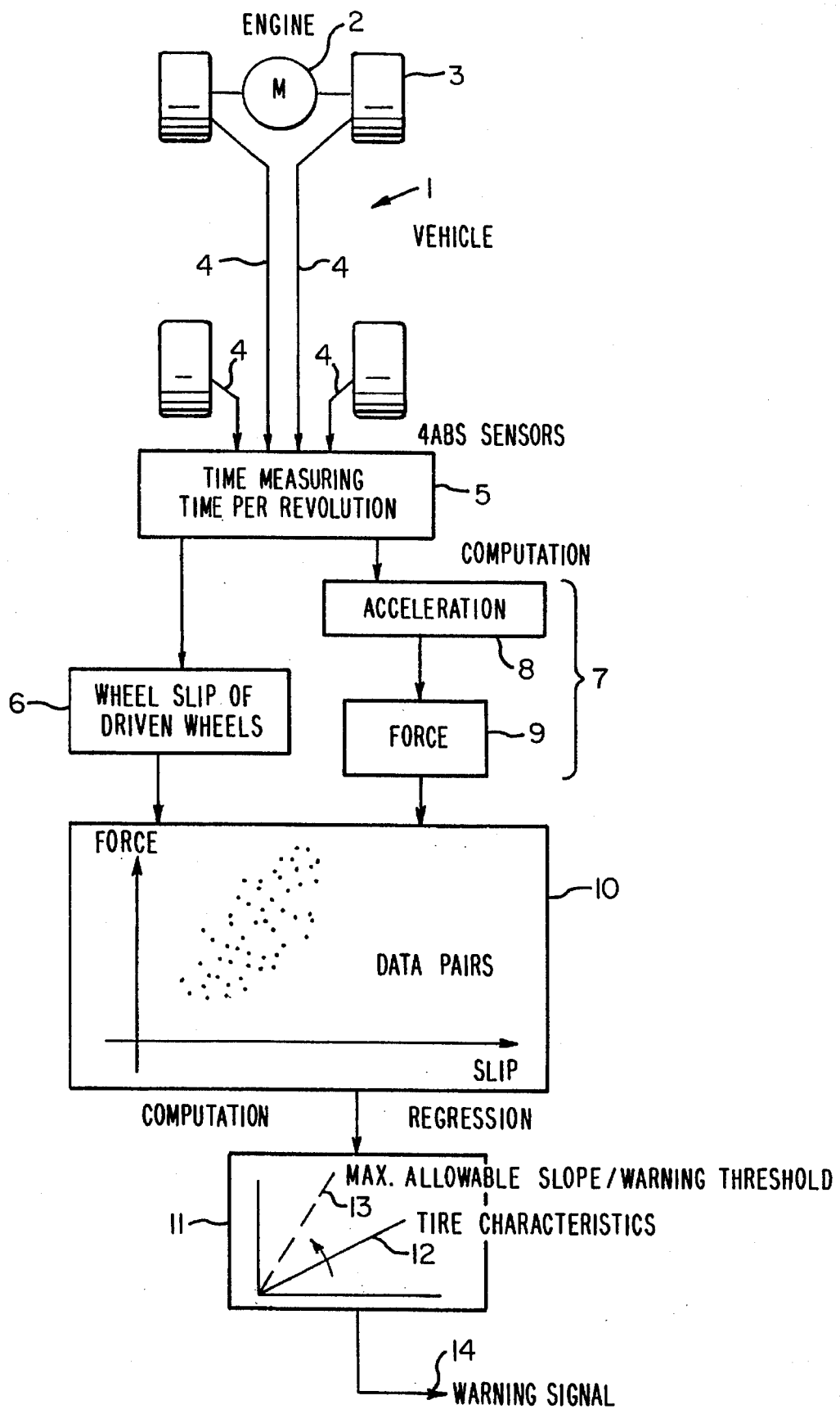

METHOD AND DEVICE FOR DETERMINING FILLING PRESSURE LOSS OF A PNEUMATIC VEHICLE TIRE

BACKGROUND OF THE INVENTION

The present invention relates to a method for determining pressure loss of a pneumatic vehicle tire on a driven axle of a motorized vehicle in which the rotational velocity of the wheels is measured and based on the rotational velocity slip values for the driven wheels are calculated. The invention further refers to a device for performing this method.

There is a considerable need to have an automatic warning for the driver of the vehicle in case the vehicle tires lose pressure. The pressure loss is often a precondition for a tire blowup which, especially for driven wheels, can have catastrophic consequences.

From European documents 0 441 599 and 0 441 600 it is known to measure and evaluate the rotational velocity of the tires. The measured value for the rotational velocity of the tires is already present for vehicles that have an automatic anti-blocking system (ABS) due to the presence of the ABS sensors. The basic principle of the known method is that due to pressure loss the rolling radius of the tire is reduced so that the corresponding wheel must turn faster. In order to prevent false warning signals when maneuvering a curve, the rotational velocities of the diagonally positioned wheels are determined. When the resulting measured average value deviates from the average value of all four rotational velocities by more than 0.1%, a warning signal is produced. However, the known methods are problematic in that only a very small measurable effect is present because the rolling radius of the tire even for a considerable pressure loss is only very small; for example, for a pressure loss of 0.5 bar the rolling radius changes by 1 mm.

It is furthermore known to provide pressure sensors within the wheel rim of the vehicle for monitoring the tire pressure. This requires, on the one hand, special sensors. On the other hand, the sensors must be positioned on rotating parts resulting in a considerable expenditure for such a warning device.

It is therefore an object of the present invention to provide a method and a device for determining the pressure loss of a tire with simple means and with a distinctly measurable effect.

SUMMARY OF THE INVENTION

The inventive method for determining pressure loss in a pneumatic vehicle tire on a driven axle of a vehicle is primarily characterized by:

Measuring the rotational velocities of the wheels;

Calculating slip values for the driven wheels based on the rotational velocities;

Determining simultaneously wheel drive forces of the vehicle for the calculated slip values;

Correlating the wheel drive forces and the calculated slip values to produce a characteristic curve;

Comparing the characteristic curve to a predetermined curve range; and

Generating a warning signal when the characteristic curve is outside the predetermined curve range.

Preferably, the step of calculating the slip values includes the step of comparing the rotational velocities of the driven wheels and the non-driven wheels for determining the slip values.

Preferably, data derived from the engine and characteristic data of the vehicle are used in the step of determining simultaneously wheel drive forces.

Advantageously, the wheel drive forces are estimated based on the vehicle acceleration.

Preferably, the vehicle acceleration is calculated based on the rotational velocities of the wheels.

In a preferred embodiment of the present invention, the step of correlating the wheel drive forces and the calculated slip values is performed during an acceleration phase of the vehicle and a straight characteristic curve is produced by approximation. The predetermined curve range is defined by a maximum slope limit, and the warning signal is produced when the maximum slope limit is surpassed.

The present invention further relates to a device for determining pressure loss in a pneumatic vehicle tire on a driven axle of a vehicle according to the inventive method. The inventive device is primarily characterized by:

Sensors for measuring the rotational velocities of the wheels of the vehicle;

A device for determining slip values of the driven wheels from the measured rotational velocities;

A device for determining the wheel drive forces;

A device for determining an actual characteristic curve by approximation by correlating the wheel drive forces and the slip values;

A device for inputting and memorizing a maximum slope limit defining a predetermined characteristic curve range; and A device for comparing the slope of the actual characteristic curve to the maximum slope limit and for emitting a warning signal when the slope of the actual characteristic curve surpasses the maximum slope limit.

In a preferred embodiment of the present invention, the device for determining the wheel drive forces comprises a computing circuit for computing based on the measured rotational velocities the acceleration of the vehicle as a value proportional to the wheel drive forces.

Advantageously, the device further comprises a means for inputting at least one payload value into the computing circuit.

Preferably, the device further comprises a means for inputting the actual tread depth of the driven wheels.

Expediently, the device further comprises a sensor for detecting the slope of the surface the vehicle is driving on.

According to the present invention, the wheel drive forces of the vehicle are determined and are correlated with the corresponding determined slip values in order to produce a characteristic curve. A warning signal is generated when the characteristic curve is outside of a predetermined characteristic curve range.

The measurable effect used according to the present invention is based on the slip value which occurs at driven wheels and whose magnitude depends on the filling pressure of the tire. When the wheel drive forces are correlated with the slip values, a characteristic curve results for the different data pairs. The slope of the characteristic curve is determined by the pressure in the tire. The slope of the characteristic curve (the curve is preferably determined by applying the principle of minimum square deviation in the form of a straight line) increases with decreasing tire pressure because the slip value also decreases for constant wheel drive forces with reduced tire pressure.

The determination of the slip values can be performed in a manner known per se by comparing the rotational velocities of the non-driven wheels with the rotational velocities of the driven wheels. By taking into consideration the rotational velocities for the non-driven wheels, it is also possible to compensate for maneuvering curves so that the action of maneuvering curves cannot result in a false warning signal.

Wheel drive forces can be computed relatively exactly by determining characteristic data of the engine while taking into consideration the characteristic data of the vehicle. For example, a torque sensor already present at the drive shaft of the vehicle can be used. Another alternative is the calculation of the wheel drive forces from data which are available from the engine electronic present within almost every vehicle, such as, for example, the amount of intake air, the suction vacuum value, the amount of injected fuel etc.

In a very simple manner, the wheel drive forces can also be determined based on measured values of the sensors for the rotational velocities of the wheels. By determining the rotational velocities, the vehicle acceleration which, as is well known, is proportional to the wheel drive forces can be determined. As long as only conventional deformation slip is present, the resulting small inaccuracy does not affect the determination of the wheel drive forces. Measurements taken during gliding slip can be neglected. In this manner it is possible, for example, only with the use of ABS sensors already present within the vehicle, to determine the characteristic curve of wheel drive forces/slip values and to derive therefrom information for a possible pressure loss of the tires on the driven wheels. In this context it may be expedient to take into consideration as further parameters the actual tread depth of the tire on the driven wheels and also the slope of the surface on which the vehicle is momentarily driving.

The inventive device for performing the inventive method is characterized by sensors for the rotational velocities of the wheels, a device for determining the slip values of the driven wheels from the measured rotational velocities, a device for determining the wheel drive forces, a device for determining a characteristic line by approximation by correlating the wheel drive forces/slip values, a device for inputting and memorizing maximum slope limit for the characteristic curves, and a device for comparing the slope of the actual characteristic curve with the memorized maximum slope limit of the characteristic curves and for releasing a warning signal upon surpassing the maximum slope limit of the characteristic curve by the actual characteristic curve.

The arrangement for determining the wheel drive forces preferably may comprise a computing circuit for determining the acceleration based on the measured rotational velocities as a value that is proportional to the wheel drive forces. For taking into consideration the changes of the wheel drive forces by a change in the mass of the vehicle, it may be expedient to provide a means for inputting at least one payload value into the computing circuit. This inputting means may, for example, be in the form of a weight sensor for the vehicle, which may be realized by employing the tank gauge and/or in the form of a manual inputting means.

Furthermore, an inputting device for the depth of the tire tread of the driven wheels and/or a sensor for the slope of the surface on which the vehicle is momentarily driving may be provided. The corresponding exit signals can be used in a suitable manner, for example, for the determination of the maximum slope limit of the characteristic curve range.

BRIEF DESCRIPTION OF THE DRAWING

The object and advantages of the present invention will appear more clearly from the following specification in conjunction with the accompanying drawing in which the method of the present invention is represented in the form of a flow chart.

DESCRIPTION OF PREFERRED EMBODIMENTS

The present invention will now be described in detail with the aid of a specific embodiment utilizing the only Figure.

The drawing shows schematically a vehicle 1 with an engine 2 and four wheels 3. Each wheel is provided with an ABS sensor the output signals of which are sent via lines 4 into a time measuring device 5 for determining the rotational velocities, respectively, the time per rotation for the individual wheels.

Connected to the time measuring device 5 is a computing device 6 for determining the wheel slip values. The computing device 6 determines the slip values for the driven wheels by comparing the rotational velocity of the non-driven and the driven wheels 3. Parallel to the computing device 6 a device 7, for determining the wheel drive forces is arranged. In a first portion 8 of this device 7 the acceleration values are determined based on the time per rotation of the wheels 3. The determined acceleration values are sent to a second portion 9 and are further processed by multiplication with the mass of the vehicle. Since the mass of the vehicle changes due to different payloads, it is possible to input into the second portion 9 corresponding measured payload values or payload adjusting values, for example, output signals from a weight sensor, a tank gauge etc. As an alternative it is also possible to input approximate payload values manually.

In a device 10 for computing the characteristic curve, the values determined in the devices 6, 7 are paired to form data pairs and a characteristic curve for the wheel drive force as a function of the slip value is produced, preferably by regression in the form of a straight line.

In a device 11 for comparing arranged downstream the determined characteristic curve 12 is compared to a predetermined maximum slope limit 13. The maximum slope limit 13 depends on the respective type of tire and is thus to be inputted individually for each type of tire. The slope of the determined actual characteristic curve 12 increases with decreasing tire pressure so that upon surpassing the maximum slope limit 13 a safe indicator for a pressure loss within the drive tire is provided. When such surpassing of the maximum slope limit is detected by the device for comparing 11, this device will generate a warning signal 14.

It should be noted that the data pairs force versus slip value are determined based on the same initial signals of the ABS sensors transmitted via the lines 4. Therefore, additional sensors are, in general, obsolete, but can be provided in order to increase the precision, for example, for a more exact determination of the wheel drive forces.

The present invention is, of course, in no way restricted to the specific disclosure of the specification and drawings, but also encompasses any modifications within the scope of the appended claims.

What I claim is:

1. A method for determining pressure loss in a pneumatic vehicle tire on a driven axle of a vehicle, said method comprising the steps of:

measuring the rotational velocities of the wheels;

calculating slip values for the driven wheels based on the rotational velocities;

determining simultaneously wheel drive forces of the vehicle for the calculated slip values;

correlating the wheel drive forces and the slip values to produce a characteristic curve;

comparing the characteristic curve to a predetermined characteristic curve range; and generating a warning signal when the characteristic curve surpasses the predetermined characteristic curve range.

2. A method according to claim 1, wherein said step of calculating the slip values includes the step of comparing the rotational velocities of the driven wheels and the non-driven wheels for determining the slip values.

3. A method according to claim 1, wherein data derived from the engine and characteristic data of the vehicle are used in the step of determining simultaneously wheel drive forces.

4. A method according to claim 1, wherein the wheel drive forces are estimated based on the vehicle acceleration.

5. A method according to claim 4, wherein the vehicle acceleration is calculated based on the rotational velocities of the wheels.

6. A method according to claim 1, wherein the step of correlating the wheel drive forces and the calculated slip values is performed during an acceleration phase of the vehicle and a straight characteristic curve is produced by approximation, wherein the predetermined characteristic curve range is defined by a maximum slope limit, and wherein the warning signal is produced when the maximum slope limit is surpassed.

7. A device for determining pressure loss in a pneumatic vehicle tire on a driven axle of a vehicle, wherein rotational velocities of the wheels are measured, slip values for the driven wheels are calculated, wheel drive forces of the vehicle for the calculated slip values are simultaneously determined, wheel drive forces and calculated slip values are correlated to produce a characteristic curve, the characteristic curve is compared to a predetermined characteristic curve range, and a warning signal is generated when the characteristic curve is outside the predetermined characteristic curve range; said device comprising:

sensors for measuring the rotational velocities of the wheels of the vehicle;

a device for determining slip values of the driven wheels from the measured rotational velocity;

a device for determining the wheel drive forces;

a device for determining an actual characteristic curve by approximation by correlating the wheel drive forces and the slip values;

a device for inputting and memorizing a maximum slope limit defining a predetermined characteristic curve range; and a device for comparing the slope of the actual characteristic curve to the maximum slope limit and for emitting a warning signal when the slope of the actual characteristic curve surpasses the maximum slope limit.

8. A device according to claim 7, wherein said device for determining the wheel drive forces comprises a computing circuit for computing, based on the measured rotational velocities, the acceleration of the vehicle as a value proportional to the wheel drive forces.

9. A device according to claim 8, further comprising a means for inputting at least one payload value into said computing circuit.

10. A device according to claim 7, further comprising a means for inputting the actual tread depth of the driven wheels.

11. A device according to claim 7, further comprising a sensor for detecting a slope of the surface the vehicle is driving on.

* * * * *